US010648378B2

(12) United States Patent
Demeulenaere et al.

(10) Patent No.: US 10,648,378 B2
(45) Date of Patent: May 12, 2020

(54) ENGINE DIPSTICK (71) Applicant: Ford Global Technologies, LLC, Dearborn, MI (US)

(72) Inventors: Xavier Demeulenaere, London (GB); Graham Slaughter, Brentwood (GB); Mark Michel, Dartford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/897,989

(22) Filed: Feb. 15, 2018

(65) Prior Publication Data

US 2018/0238206 A1   Aug. 23, 2018

(30) Foreign Application Priority Data

Feb. 17, 2017   (GB) .................... 1702629.5

(51) Int. Cl.
*F01M 11/12*      (2006.01)
*G01F 23/04*      (2006.01)
*F01M 11/00*      (2006.01)

(52) U.S. Cl.
CPC ......... *F01M 11/12* (2013.01); *F01M 11/0004* (2013.01); *G01F 23/04* (2013.01); *F01M 2011/0008* (2013.01)

(58) Field of Classification Search
CPC ...... F01M 11/02; F01M 11/0004; G01F 23/05
See application file for complete search history.

(56) References Cited

U.S. PATENT DOCUMENTS

| 4,213,441 A * | 7/1980 | Hamparian ............ F01M 11/04 123/195 R |
| 2005/0166887 A1 | 8/2005 | Markou |
| 2009/0020366 A1 | 1/2009 | Mori et al. |
| 2009/0145395 A1 | 6/2009 | Ishii et al. |
| 2010/0154237 A1 * | 6/2010 | Amiri ..................... G01F 23/04 33/726 |

FOREIGN PATENT DOCUMENTS

| CN | 103147875 A | 6/2013 |
| DE | 10339364 A1 | 3/2005 |
| GB | 734540 A | 8/1955 |
| GB | 2032518 A | 5/1980 |
| JP | S56145617 U | 11/1981 |
| JP | H09195747 A | 7/1997 |
| JP | 2005273786 A | 10/2005 |

(Continued)

OTHER PUBLICATIONS

European Patent Office, Extended European Search Report Issued in Application No. 18155414.8, dated Jun. 21, 2018, Germany, 7 pages.

(Continued)

*Primary Examiner* — Kevin A Lathers
(74) *Attorney, Agent, or Firm* — Geoffrey Brumbaugh; McCoy Russell LLP (57) ABSTRACT An engine with an engine casing and a dipstick. The dipstick extends into the engine casing and has a free end. The design of the free end may be selected such that the natural frequency of the dipstick does not resonate with the operating frequency of the engine. The dipstick may also be oriented such that the free end does not contact the engine.

18 Claims, 6 Drawing Sheets (56) References Cited

FOREIGN PATENT DOCUMENTS

| | | | |
|---|---|---|---|
| JP | 2007211593 | A | 8/2007 |
| JP | 2012107518 | A | 6/2012 |
| JP | 2015034528 | A | 2/2015 |
| JP | 2015063906 | A | 4/2015 |
| JP | 2015102043 | A | 6/2015 |

OTHER PUBLICATIONS

Intellectual Property Office of the United Kingdom, Combined Search and Examination Report Issued in Application No. GB1702629.5, dated May 31, 2017, South Wales, 5 pages.

* cited by examiner

ENGINE DIPSTICK

CROSS REFERENCE TO RELATED APPLICATION

This application claims priority to Great Britain Patent Application No. 1702629.5, filed Feb. 17, 2017. The entire contents of the above-referenced application are hereby incorporated by reference in its entirety for all purposes.

FIELD

The present description relates generally to methods and systems for an engine with an engine casing and a dipstick.

BACKGROUND/SUMMARY

Typically, when a dipstick is installed in an engine, it extends through an opening provided towards the top of the engine, and through one or more portions of engine casing. For example, the dipstick may extend through a cam cover, a cylinder head, a cylinder block, and into a ladderframe casing. A free end of the dipstick is positioned in the oil contained in an oil pan at the bottom of the engine.

As a result of the required characteristics of the dipstick, such as its material properties and its elongated shape, it is particularly prone to bending and vibration. For example, where the portions of the engine casing are provided with simple through holes for the dipstick to pass through, potential noise vibration and harshness (NVH) issues may be experienced. For example, a portion of the dipstick may be free to vibrate, and possibly even resonate, during engine operation. Additionally, due to the proximity of the free end of the dipstick to the oil pan, the free end of the dipstick may vibrate and contact an interior wall of the oil pan, which can lead to a harsh rattling noise during operation of the engine.

In one example, the issues described above may be addressed by a system for an engine comprising an engine casing and a dipstick, the dipstick having a free end that extends into the engine casing when the dipstick is installed to the engine casing, wherein the dipstick is adapted such that the lowest natural frequency of the free end of the dipstick is above the highest operational frequency of the engine. At least one of the shape, configuration and mass distribution of the free end of the dipstick may be selected so that the lowest natural frequency of the free end of the dipstick is above the highest operational frequency of the engine. In this way, the frequency and orientation of the dipstick may be selected such that the noise vibration and harshness of the dipstick is reduced.

As one example, dipstick may contact portions of the engine casing as it extends into the engine. These contact points may orient that free end of the dipstick such that it doesn't contact a wall of the engine casing. Furthermore, these contact points may change the vibration characteristics of the dipstick. For example, the contact points may reduce the unconstrained portions of the dipstick and the dipsticks vibrational frequency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-6 are shown approximately to scale.

DETAILED DESCRIPTION

The following description relates to systems and methods for reducing NVH of dipsticks. Embodiments of the disclosure include systems and methods for reducing the vibrational frequency of the dipstick. Further embodiments modify the orientation of the dipstick to prevent the free end from contacting problematic areas. Embodiments may feature the dipstick contacting particular areas of the engine casing to reduce free end length and vibrations. Further embodiments include shaping the dipstick with projections or bends to modify the NVH characteristics. The figures will depict certain exemplary embodiments discussed in the description.

The engine casing may comprise an opening, such as a through hole or a recess, configured to receive the dipstick. The opening may comprise a wall configured to engage the dipstick. The dipstick and the wall of the opening may cooperate to define the free end of the dipstick that extends into the engine casing. Operation of the engine may cause the free end of the dipstick to vibrate, for example at one or more particular operational frequencies of the engine. The cooperation between the wall of the opening and the dipstick may ensure that the free end of the dipstick is unable to resonate during operation of the engine. For example, the length may of the free end may be defined such that a range of frequencies of vibration is selected.

The engine casing may comprises a first projection configured to engage the dipstick. The first projection may be an edge of a sloped wall of the opening, or the apex of a curved surface of the opening. The first projection may comprise a ridge, bump or nodule, configured to engage the dipstick when the dipstick is installed in the engine casing. The first projection may be positioned on the engine casing so as to determine the length of the free end of the dipstick when the dipstick is installed to the engine casing.

The first projection may be configured to deflect the free end of the dipstick away from an interior wall of the engine casing when the dipstick is installed in the engine casing. For example, the first projection may be configured to deflect the free end of the dipstick away from an interior wall of the oil pan. The deflection of the dipstick caused by the first projection may be sufficient to prevent the free end of the dipstick from contacting the interior wall of the engine casing.

The first projection may be formed integral to the engine casing. For example, the first projection may be a feature formed during manufacture of the engine casing. The first projection may also be formed separately from the engine casing and subsequently assembled to the engine casing.

The dipstick may comprise a second projection configured to engage the engine casing. The second projection may be a protuberance from the surface of the dipstick. This protuberance may be formed as a result of the curvature of the dipstick. Embodiments may also feature both a protuberance and a protuberance formed by curvature. The second projection may be positioned on the dipstick so as to determine the length of the free end of the dipstick when the dipstick is installed to the engine casing. The first and second projections may cooperate to determine the length of the free end of the dipstick when the dipstick is installed in the engine casing. The second projection may be configured to deflect the free end of the dipstick away from an interior wall of the engine casing when the dipstick is installed to the engine casing. The deflection of the dipstick caused by the second projection may be sufficient to prevent the free end of the dipstick from contacting the interior wall of the engine casing.

The second projection may be formed integral to the dipstick. For example, the second projection may be a feature formed during manufacture of the dipstick. The second projection may be formed separately from the dipstick and subsequently assembled to the dipstick.

The dipstick may be configured such that the second moment of area of the free end of the dipstick is selected to ensure a natural frequency of the free end of the dipstick is above an operational frequency of the engine. For example, the dipstick may be configured to have a non-uniform cross section that influences the natural frequency of the free end of the dipstick. Other embodiments, may select the length of the free end of the dipstick to determine a range of frequencies.

The dipstick may be configured such that the modulus of elasticity of the free end of the dipstick is selected to ensure that lowest natural frequency of the free end of the dipstick is above the highest operational frequency of the engine. For example, the dipstick may be configured to have a modulus of elasticity that influences the natural frequency of the free end of the dipstick. The free end of the dipstick may be manufactured from a different material from the remaining portion of the dipstick.

The dipstick may comprise a mass provided towards the free end of the dipstick. At least one of the position of the mass and a material of the mass may be selected to ensure that lowest natural frequency of the free end of the dipstick is above the highest operational frequency of the engine. The mass may be a feature formed during manufacture of the dipstick. The mass may be formed separately from the dipstick and subsequently assembled to the dipstick.

The engine casing may be formed from at least one of a cam cover, a cylinder head, a cylinder block, a ladderframe casing and an oil pan. The opening may be an opening in a ladderframe casing configured to support a balancer shaft assembly of the engine.

According to another aspect of the present disclosure there is provided an engine comprising an engine casing and a dipstick, the dipstick having a free end that extends into the engine casing when the dipstick is installed to the engine casing, wherein at least one of the engine casing and the dipstick has a projection configured to deflect the free end of the dipstick away from an interior wall of the engine casing proximate to where the free end terminates.

The projection may be configured to deflect the dipstick away from the interior wall of the engine casing by an amount sufficient to prevent contact between the free end of the dipstick and the interior wall when the dipstick resonates.

According to another aspect of the present disclosure there is provided a method of designing an engine comprising an engine casing and a dipstick, the dipstick having a free end that extends into the engine casing when the dipstick is installed to the engine casing, the method comprising: adapting so that the lowest natural frequency of the free end of the dipstick is above the highest operational frequency of the engine.

The step of adapting the dipstick may comprise selecting at least one of the shape, configuration and mass distribution of the free end of the dipstick.

The engine casing may comprise an opening configured to receive the dipstick. The step of adapting the engine casing may comprise selecting at least one of the shape and the configuration of the opening.

Multiple openings may also be selected to influence the dipstick. The angle of these openings may also be selected. Further, the openings may be selected to influence the angle of the dipstick passing through the openings. The opening may be selected to influence the length of the dipstick that is not in contact with the engine casing. These free lengths may influence the frequency of vibration of the dipstick.

Figure 1:
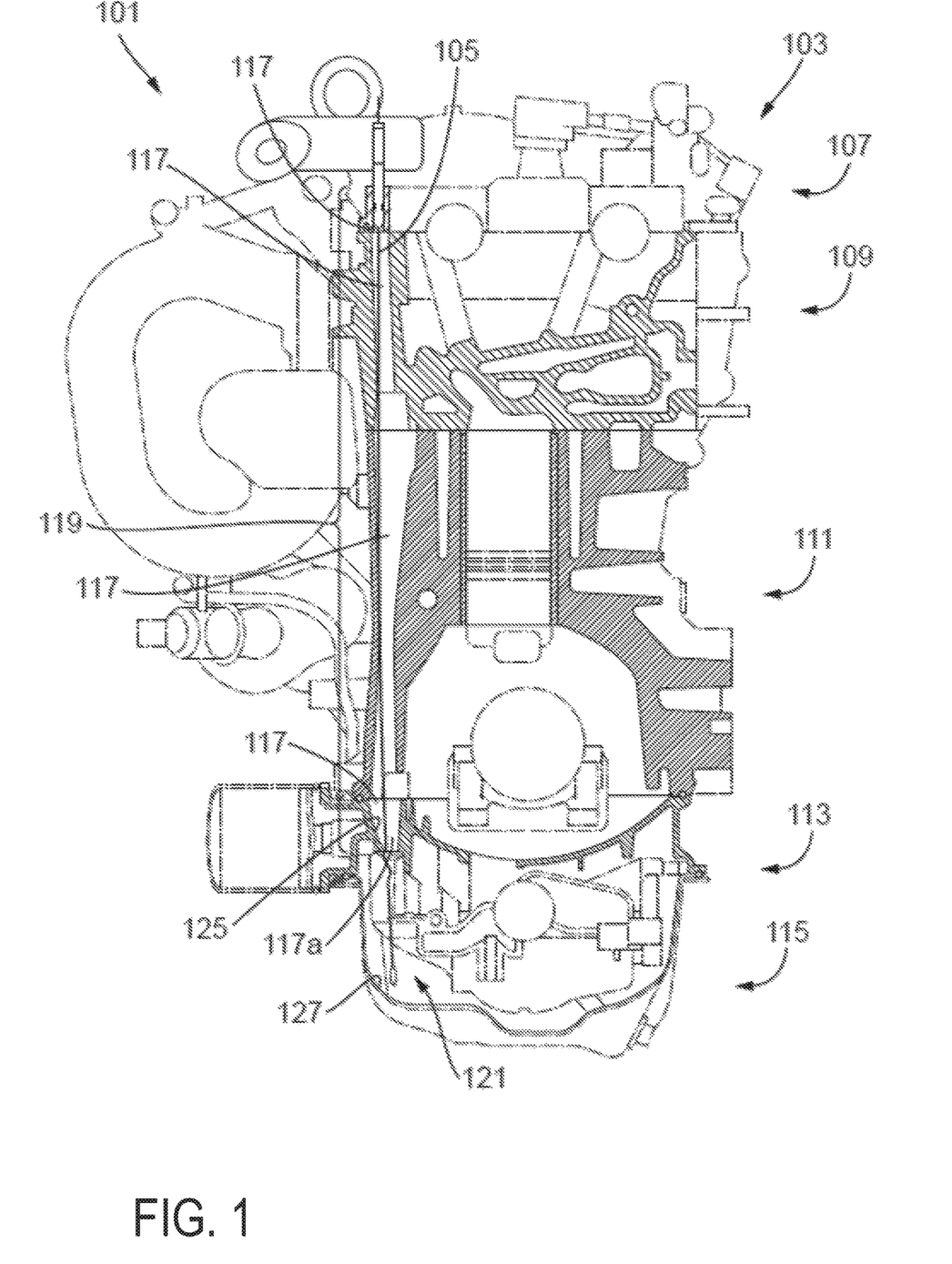
FIG. 1 shows a cross section through an engine.
Figure 2:
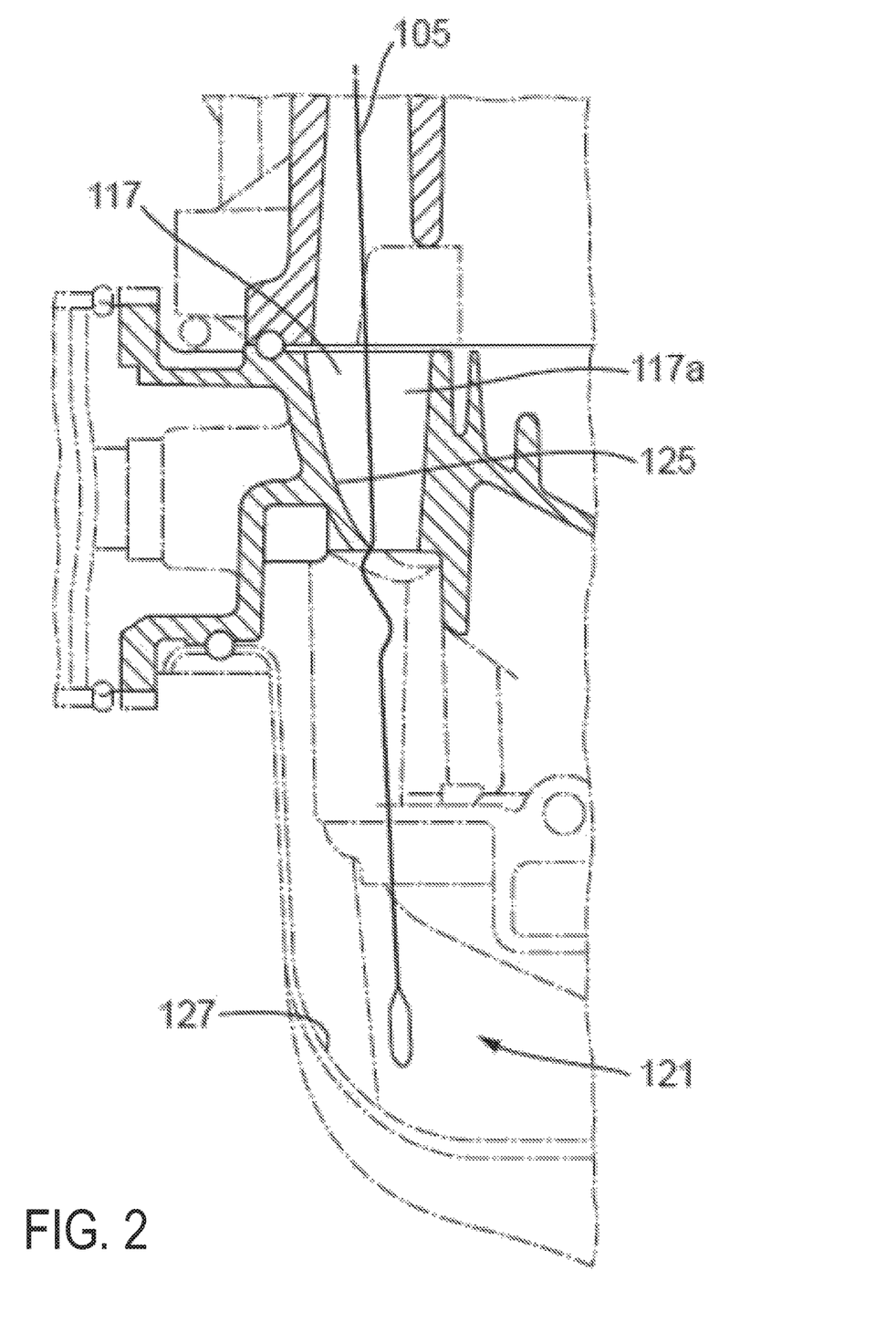
FIG. 2 shows a partial cross section though a lower portion of the engine.

The present disclosure provides an engine 101 comprising an engine casing 103 and a dipstick 105. FIGS. 1 and 2 show cross sections through the engine 101 in an assembled configuration. In the arrangement shown in FIGS. 1 and 2, the engine casing 103 comprises a plurality of casing portions, such as a cam cover 107, a cylinder head 109, a cylinder block 111, a ladderframe casing 113 and an oil pan 115. However, the engine casing 103 may comprise any appropriate number and/or type of casing portions depending on the configuration of the engine.

Each of the casing portions is provided with an opening 117 configured to receive a dipstick 105, the openings 117 being aligned to form a channel 119 that extends through the engine casing 103. The dipstick 105 is inserted into the top of the engine casing 103. The dipstick extends down through the engine casing 103 such that a free end 121 of the dipstick 105 terminates in the oil pan 115. The dipstick 105 can measure the level of oil in the oil pan 115. In the arrangement shown in FIGS. 1 and 2, the channel 119 extends in a vertical direction through the engine casing 103. However, in one or more other arrangements (not shown), the channel 119 may extend in any appropriate direction(s) that allow the dipstick 105 to be inserted into the engine casing 103.

In order to secure the dipstick 105 in place when installed to the engine 101, the engine casing 103 is configured such that the channel 119 formed by the openings 117 acts to deform the dipstick 105 as the dipstick 105 is inserted through the channel. For example, the channel 119 in the engine casing 103 of FIG. 1 is formed such that the curvature of channel 119 through the engine casing 103 is greater than the longitudinal curvature of the dipstick 105 in an uninstalled state. In this manner, the channel 119 is configured to constrain the dipstick 105 at one or more points where a wall of the channel 119 engages the dipstick 105.

The dipstick 105 may also feature a curvature when in an uninstalled state. This curvature may be formed by bending the dipstick, selecting specific materials, or by other means. A curvature in the dipstick may cause the dipstick to contact portions of the channel 119 in a desired manner. This method may not include changing the shape of channel 119.

A dipstick may be constrained at two or more points along the channel, for example at a portion of the channel formed in the cam cover and at a portion of the channel formed in the cylinder block. However, it is common for the free end of the dipstick to vibrate during operation of the engine, as a result of how the dipstick is constrained. In some cases, the free end of the dipstick may resonate at one or more operational frequencies of the engine, which causes unwanted noise vibration and harshness (NVH) issues. Contact of the free end of the dipstick with an interior wall of the oil pan of the engine casing may exacerbate NVH problems.

The engine 101 according to the present disclosure is configured to prevent unwanted NVH issues associated with the vibration of the dipstick 105, such as when the dipstick 105 resonates at one or more operational frequencies of the engine 101. This is achieved by configuring the engine casing 103, the dipstick 105, or both such that they cooperate to ensure that the lowest natural frequency of the free end 121 of the dipstick 105 is above the highest operational frequency of the engine 101.

In the arrangement shown in FIGS. 1 and 2, the channel 119 is configured to constrain the dipstick 105 in a manner that ensures the free end 121 of the dipstick 105 is sufficiently short to avoid the lowest natural frequency of the unconstrained end 121 of the dipstick 105 from coinciding with an operational frequency of the engine 101. However, the engine casing 103 and the dipstick 105 may be configured in any appropriate manner that tunes the dipstick 105 such that dipstick 105 does not resonate during operation of the engine 101. For example, the form of the dipstick 105 may be selected to determine that the free end 121 of the dipstick 105 has a suitable second moment of area to avoid the dipstick 105 from resonating during operation of the engine 101. Additionally or alternatively, the material from which the dipstick 105, or at least the free end 121 of the dipstick 105, is fabricated has a modulus of elasticity selected to avoid the dipstick 105 from resonating during operation of the engine 101.

In other arrangements the dipstick 105 may comprises a body of material provided towards the free end of the dipstick 105. The position of the body of material relative to the free end 121 of the dipstick 105 to ensure that lowest natural frequency of the free end 121 of the dipstick 105 is above the highest operational frequency of the engine 101. The material from which the body is fabricated may also be selected to influence the frequency. In this manner, the present disclosure provides an engine 101 in which at least one feature of the engine casing 103, such as the shape of an opening 117 through which the dipstick 105 passes, is selected in combination with or independently from at least one feature of the dipstick 105 itself, such as the form of the dipstick 105, to ensure that the dipstick 105 does not resonate during the operation of the engine 101.

In the arrangement shown in FIGS. 1 and 2, a wall 125 of the opening 117a is configured to engage and guide the dipstick 105 as the dipstick 105 is inserted into the engine casing 103. For example, the wall 125 may comprise a sloped surface that engages the dipstick 105 to guide the free end 121 of the dipstick 105 away from an interior wall 127 of the oil pan 115. In this manner, the dipstick 105 cooperates with the wall 125 of the opening 117a to define the unconstrained/free end 121 of the dipstick 105. The positioning of this opening may also be selected to influence the length of the free end 121 of the dipstick. The length of the free end 121 may influence the frequency of vibration and NVH. Similarly, the sloped surface of wall 125 may extend further downward towards oil pan 115 to influence the length of free end 121.

In the arrangement shown in FIGS. 1 and 2, the opening 117a in the ladderframe casing 113 comprises a through hole configured to allow the dipstick 105 to pass through a wall of the ladderframe casing 113 that engages the cylinder block 109. In one or more other arrangements, the opening 117 may be of any appropriate form that permits the dipstick 105 to pass through the component in which the opening 117 is formed. For example, the opening 117a may comprise a recessed portion of a wall of the engine casing 103. As such, it is understood that the opening 117 in the engine casing 103 may form a channel through the engine casing 103. In the arrangement shown in FIGS. 1 and 2, the sloped surface of the opening 117a urges the dipstick 105 away from the interior wall 127 of the oil pan 113. However, the opening 117a may comprise any appropriate feature configured to deflect the free end 121 of the dipstick 105 away from the interior wall 127. For example, the opening 117a may comprise a projection, such as a ridge or any protuberance, configured to engage and deflect the dipstick 105. Additionally or alternatively, the dipstick 105 may comprise a projection, such as a ridge or bend, configured to engage the engine casing 103. In this manner, the present disclosure provides an engine casing 103 and dipstick 105 assembly configured to prevent the free end 121 of the dipstick 105 from contacting an interior wall of the engine casing during operation of the engine 101.

Figure 3:
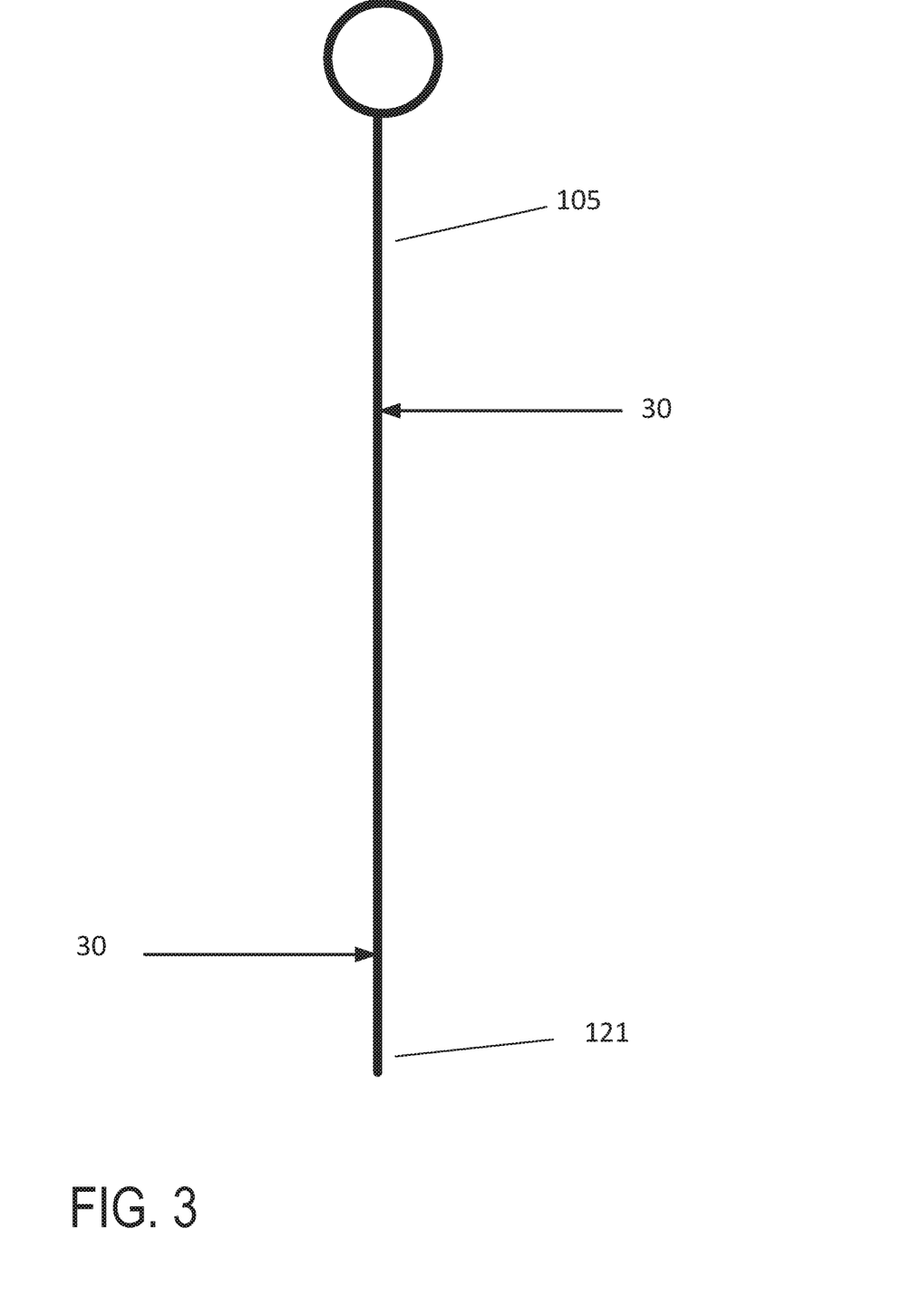
FIG. 3 shows a simplified diagram of the dipstick showing forces.
Figure 5:
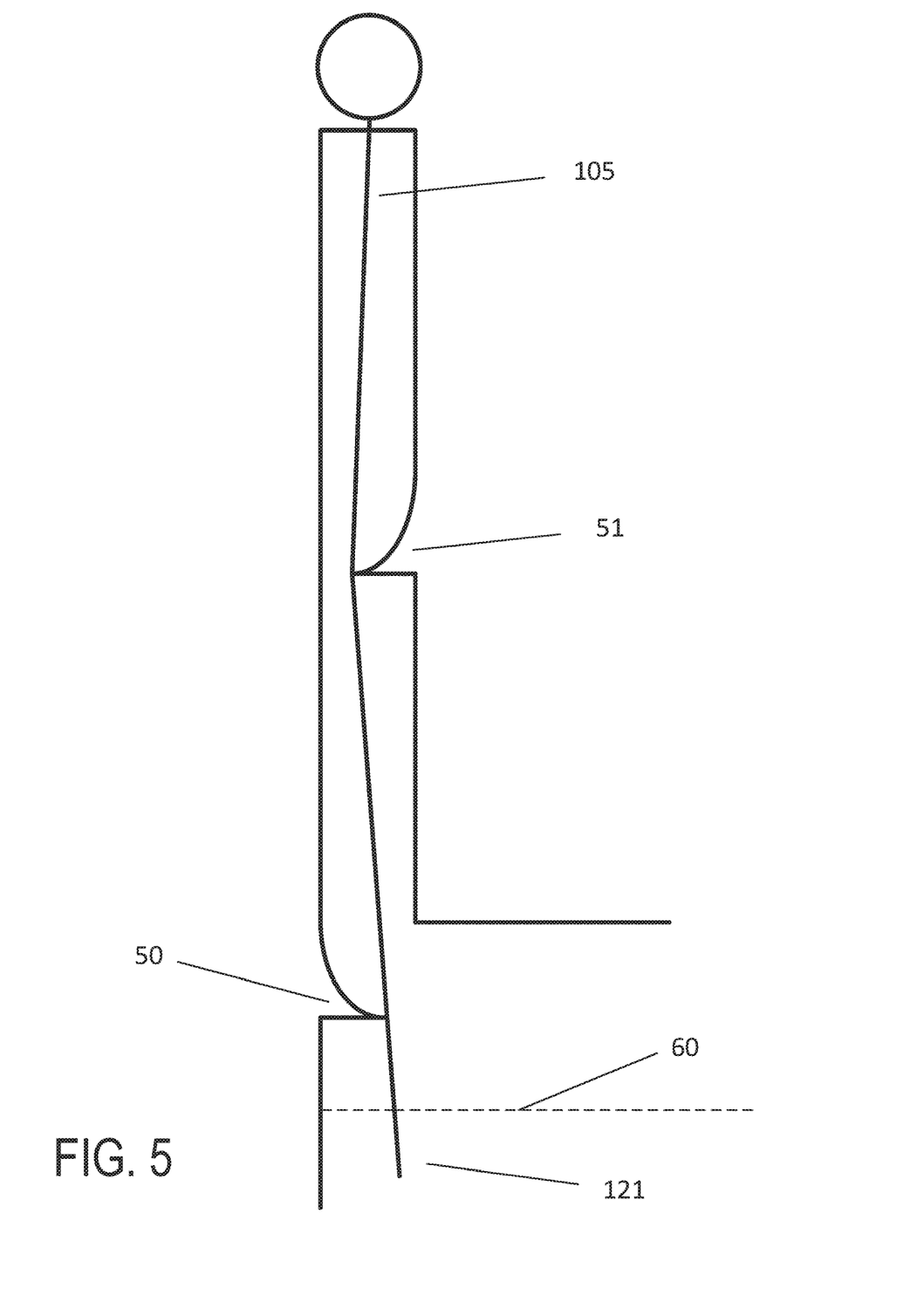
FIG. 5 shows an embodiment of a dipstick contacting two projections.

FIG. 3 shows a simplified depiction of an embodiment of an engine dipstick 105 with forces 30 acting on it. These forces 30 may be caused by casing contact points 50 and 51 on walls of the engine casing. The forces may also because by contact with the walls of the engine casing. The dipstick 105 may have a material resiliency such that it extends in a straight manner when not deformed. However, the forces 30 acting on dipstick 105 may cause the dipstick to deflect. FIG. 5 depicts how a dipstick may deflect when installed. The forces 30 acting on the dipstick may also affect the orientation of the free end 121. The forces 30 acting on the dipstick may also affect the orientation of the free end 121. Furthermore, the forces 30 may also affect the vibrational frequency of the dipstick 105 when installed.

Figure 4:
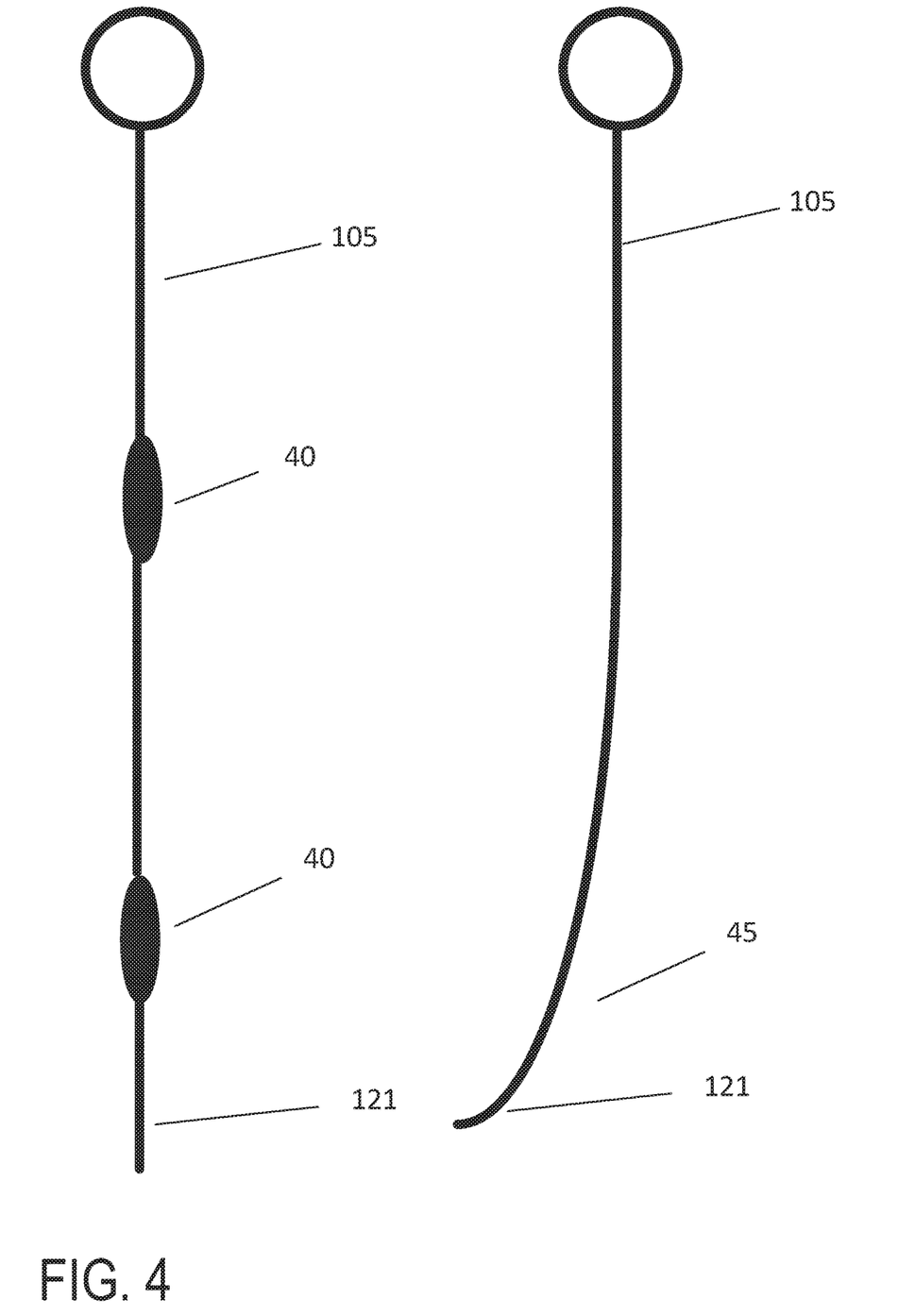
FIG. 4 shows embodiments of the dipsticks.

FIG. 4 depicts embodiments of dipstick 105. One embodiment of the dipstick 105 include dipstick projections 40. These dipstick projections 40 may be shaped in many different ways. The dipstick projections 40 may also be designed such that they interact with the casing contact points 50 and 51 from the walls of the engine casing. Furthermore, the dipstick projections 40 may influence the frequency of vibration of the dipstick 105. The dipstick projections 40 as depicted in FIG. 4 would affect the weight distribution and vibrational frequency of the dipstick 105. Further embodiments may add weight to the free end 121 to further affect vibrational frequency.

FIG. 4 also depicts and embodiment of a dipstick 105 with a curve 45. The curve 45 of the dipstick may be created during manufacturing of the dipstick such as by bending or material selection. The curve may affect how the dipstick 105 interacts with the engine casing. More specifically, the curve 45 may allow the dipstick to more effectively interact with casing contact points 50 and 51. This interaction with the casing contact points 50 and 51 may cause the free end 121 to be oriented away from a wall of the engine casing. Furthermore, the curve 45 and interactions with casing contact points 50 and 51 may cause a change in the vibrational frequency of the dipstick 105.

FIG. 5 depicts an embodiment of a dipstick 105 in an engine casing. The depiction of the engine casing has been simplified to emphasize the interaction between the dipstick 105 and elements of the casing. For example, the dipstick 105 is depicted interaction with casing contact points 50 and 51. The casing contact points 50 and 51 cause deflection of the dipstick 105. The depicted in the depicted embodiment includes two casing contact points 50 and 51 causing deflection but other combinations are equally possible. The lower casing contact point 50 deflections the free end 121 away from the wall of engine casing. The lower casing contact point 50 includes a projection. If the lower casing contact point 50 were not present, the free end 121 may be free to vibrate against the wall causing NVH. Furthermore, the lower casing contact point 50 causes a change in length of the free end 121 of the dipstick. This change in length of the free end 121 may affect the vibrational frequency of the dipstick. The lower casing contact point 50 deflects free end 121 but allows the free end 121 to reach below oil level 60.

The upper casing contact point 50 deflects dipstick 105 such that it interacts with the lower casing contact point 50. If upper casing contact point 51 were not present, the interaction of dipstick 105 and the lower casing contact point 50 may be limited. For example, the dipstick 105 would be unconstrained from moving away from the lower casing contact point 50. The upper casing contact point 51 may include a projection. The upper casing contact point 51 may also affect the vibrational frequency of the dipstick 105. The upper casing contact point 51 affects the unconstrained length of the dipstick 105. The change in unconstrained length may affect the vibrational frequency. In the depicted embodiment, the length between lower casing contact point 50 and the insertion point would be unconstrained to vibrate without upper casing contact point 50.

The embodiment depicted in FIG. 5 is one of many possible embodiments. Further embodiments may feature a different number of casing projections. They may also feature dipstick projections to interact with the casing projections. Such dipstick projections may include weight that affects the vibrational frequency. The dipstick may also be bent to affect the interaction between the dipstick and the casing projections. Further embodiments such as differing shapes of casing projections and dipstick projections are also possible. The engine casing may be shaped in such a way that the dipstick interacts with the casing walls without projections. Many more embodiments are possible without deviating from the present disclosure.

Figure 6:
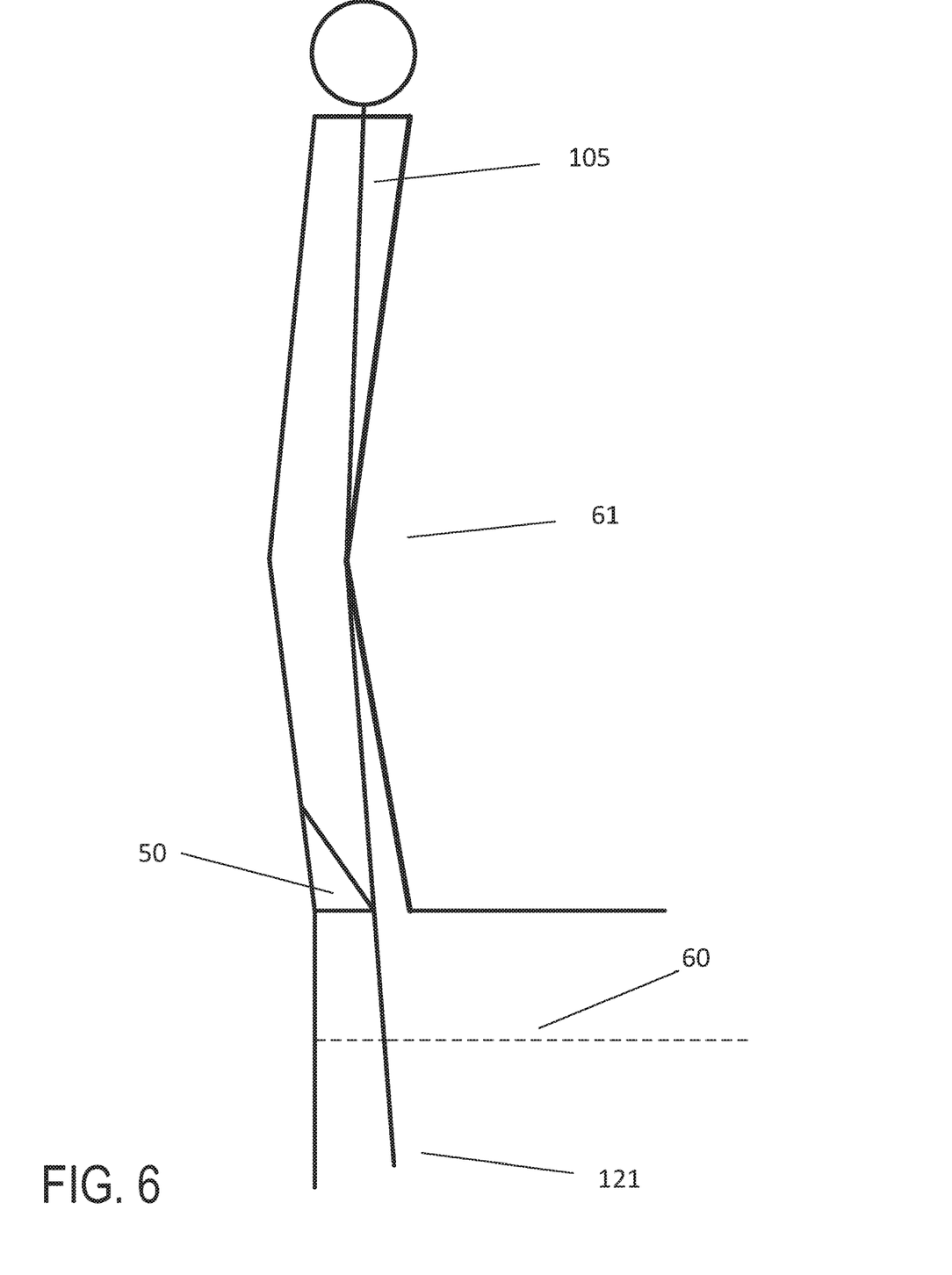
FIG. 6 shows an embodiment of a dipstick contacting an engine casing wall and projection.

One such further embodiment is depicted in FIG. 6. Dipstick 105 interacts with the engine casing wall at contact point 61. The orientation of the engine casing is such that the dipstick will bend to contact point 61. Casing contact point 50 also interacts with the dipstick 105. The point 61 and contact point 50 affect the unconstrained length of the dipstick 105 and the natural frequency. The point 61 and contact point 50 also orient the free end 121 away from the engine casing wall.

In this way, the noise, vibration and harshness of the dipstick may be reduced. Conventional dipsticks may be free to vibrate at resonate frequencies with the engine and vibrate against engine casing walls producing noise. Embodiments of the disclosure affect the vibrational frequency of the dipstick. The modified frequency may produce less NVH and be prevented from resonating with the engine. Furthermore, embodiments of the disclosure orient such that the free end does not contact the casing and the unconstrained length is reduced.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine comprising an engine casing and a dipstick, the dipstick extending into the engine casing when the dipstick is installed to the engine casing,
the engine casing having a plurality of projections positioned to contact and constrain the dipstick,
a free end of the dipstick defined as an unconstrained length below a projection closest to an oil level extending from a wall of an oil pan, and
the projection closest to the oil level deflecting the free end of the dipstick away from the wall of the oil pan such that a lowest natural frequency of the free end of the dipstick is above a highest operational frequency of the engine.

2. The engine according to claim 1, wherein the engine casing comprises an opening configured to receive the dipstick, the dipstick cooperating with a wall of the opening to define the free end and the unconstrained length of the dipstick.

3. The engine according to claim 2, wherein a first projection of the plurality of projections is configured to engage the dipstick, and wherein the first projection is positioned on the engine casing to contact the dipstick when the dipstick is installed to the engine casing.

4. The engine according to claim 1, wherein the projection closest to the oil level contacts the dipstick on a side of the oil pan wall.

5. The engine according to claim 4, wherein a modulus of elasticity of the free end of the dipstick and the unconstrained length are selected to ensure that the lowest natural frequency of the free end of the dipstick is above the highest operational frequency of the engine.

6. The engine according to claim 5, wherein the dipstick comprises a mass provided towards the free end of the dipstick and least one of a position of the mass and a material of the mass is selected to ensure that the lowest natural frequency of the free end of the dipstick is above the highest operational frequency of the engine.

7. An engine including:
an engine casing;
a dipstick configured to extend into the engine casing;
a plurality of contact points positioned to contact the dipstick;
one of the contact points positioned on the engine casing to deflect the dipstick; and
a free end of the dipstick below a contact point deflected in a direction extending away from a wall of an oil pan by a contact point closest to an oil level contacting a side of the dipstick facing the wall of the oil pan.

8. The engine of claim 7, wherein the dipstick extends through a channel in the engine casing and one or more contact points extend outwardly from vertical walls of the channel to deflect the dipstick.

9. The engine of claim 8, wherein the dipstick is deflected such that curvatures of the dipstick are oriented in opposing directions and deflection nearest the oil pan creates a curvature extending away from the wall of the oil pan.

10. An engine including:
an engine casing;
a dipstick configured to extend into the engine casing;
the engine casing having one or more contact points positioned to contact the dipstick;
a first contact point nearest an oil level extending in a first direction away from a wall of an oil pan to deflect the dipstick in the first direction; and
a free end of the dipstick being unconstrained below the first contact point and the first contact point deflecting the free end away from the wall of the oil pan.

11. The engine of claim 10, wherein a second contact point is positioned to deflect the dipstick.

12. The engine of claim 11, wherein the first and second contact points are oriented in opposite directions.

13. The engine of claim 12, wherein the first contact point includes a ramp shape extending from a dipstick insertion side to a tip of the extension.

14. The engine of claim 10, wherein the dipstick includes projections.

15. The engine of claim 10, wherein the dipstick includes a bend such that the free end is oriented at an angle relative to a handle when the dipstick is not installed in the engine casing.

16. The engine of claim 11, wherein one of the first or second contact points is positioned below a cylinder.

17. The engine of claim 10, wherein the first contact point includes a projection contacting the dipstick on a side of an oil pan wall and deflecting the dipstick away from the oil pan wall.

18. The engine of claim 17, wherein the free end of the dipstick is less than a quarter of a length of the dipstick.

* * * * *